C. D. O'BRIEN, Jr. & G. R. O'BRIEN.
OSCILLATING TOY.
APPLICATION FILED FEB. 13, 1918.
1,286,728.
Patented Dec. 3, 1918.
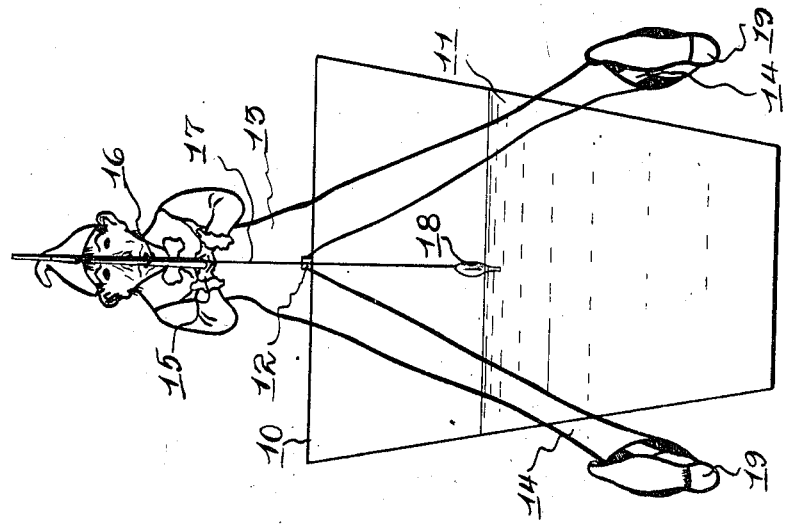
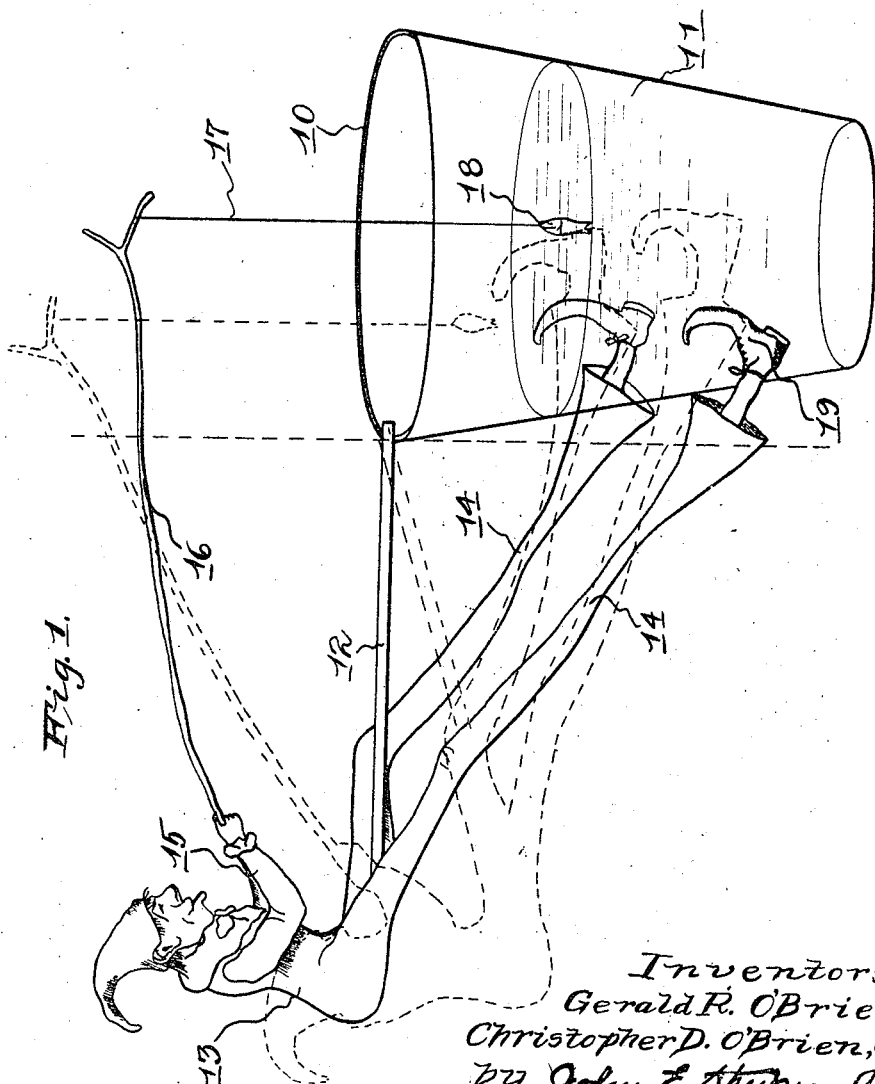
Inventors
Gerald R. O'Brien
Christopher D. O'Brien, Jr.
By John E. Stryker Atty.

UNITED STATES PATENT OFFICE.

CHRISTOPHER D. O'BRIEN, JR., AND GERALD R. O'BRIEN, OF ST. PAUL, MINNESOTA.

OSCILLATING TOY.

1,286,728.    Specification of Letters Patent.    Patented Dec. 3, 1918.

Application filed February 13, 1918. Serial No. 216,969.

*To all whom it may concern:*

Be it known that we, CHRISTOPHER D. O'BRIEN, Jr., and GERALD R. O'BRIEN, citizens of the United States, residing at St. Paul, in the county of Ramsey and State of Minnesota, have invented new and useful Improvements in Oscillating Toys, of which the following is a specification.

The object of our invention is to provide a new and useful oscillating toy.

It is our further object to provide a toy comprising a manikin seated in stable equilibrium upon an oscillatory support, one end of which rests upon a stationary fulcrum.

More specifically, our object is to provide such a toy embodying a grotesque figure representing a fisherman holding a pole and line with a fish attached and so counterweighted as to teeter upon the rim of a tumbler or similar receptacle with the line and fish suspended within said receptacle.

In the accompanying drawings, Figure 1 is a side elevation of our device, the dotted lines illustrating the manikin at one end of its swing; and Fig. 2 is a front elevation thereof.

Referring to the drawings, we have used the reference numeral 10 to indicate a transparent reservoir, such as a common drinking glass or tumbler, partially filled with water 11. The toy is supported upon the edge of said glass and comprises a staff 12 with one end upon the upper edge of the wall of said tumbler and a manikin 13 mounted upon the opposite end of said staff with its legs 14 inclined downward and forward and spread apart to swing upon each side of said reservoir. The arms 15 of said manikin are shown holding a fish pole 16, which projects above the reservoir 10 and is provided with a fish line 17 suspended over said reservoir with an imitation fish 18 attached to the lower end of the line. The body and legs of the manikin 13 are constructed of light material such as pasteboard or papier mâché, or these parts may consist of a wire frame clothed with any suitable material, such as textile fabric. The feet 19 and the fish 18 are of heavy material, such as lead, and are positioned upon opposite side of the center of gravity or point of support of the manikin from that of the body and upper portion of the legs of said manikin. The function of such weighted feet and fish is, of course, to counterbalance the weight of the body 13, legs 14 and staff 12, which are upon the opposite side of said center of gravity.

When the manikin is at rest (solid lines, Fig. 1), the fish 18 is submerged in the water 11.

When the equilibrium of the device is disturbed, as, for instance, by pressure upon the figure 13, said figure teeters up and down, the fish 18 being raised from the water at each downward movement of the manikin and dropped back into the water upon the return movement. Such oscillations gradually decrease until the equilibrium of the device is reëstablished.

The staff 12 and pole 16 may be permanently attached to said manikin 13, or may be removably inserted into bores in the body and hands respectively of the figure. When constructed in the latter manner, the toy may be taken apart for compact shipment in a box and assembled by a purchaser.

Having described our invention, what we claim as new and desire to protect by Letters Patent is:

1. In a device of the class described, a transparent reservoir, an oscillatory manikin supported upon one edge of said reservoir with the major portion of the body thereof on one side of said reservoir, a counterweight for said body portion consisting of feet straddling said reservoir, and a pendent body within said reservoir.

2. In a device of the class described, a reservoir, an oscillating figure resting upon one edge of said reservoir and comprising a staff, a manikin mounted on one end of said staff outside said reservoir, a projecting pole above said reservoir, a line attached to said pole and passing into said reservoir, an object suspended on the end of said line within said reservoir, and means on said figure for counterbalancing said figure.

3. In a device of the class described, a reservoir, a staff fulcrumed at one end on said reservoir, a figure secured upon the opposite end of said staff, legs on said figure projecting toward said reservoir and diverging to lie upon each side of said reservoir, weighted feet on said legs to counterbalance the weight of said figure and staff, a pole projecting from said figure above said reservoir, and an object suspended within said reservoir from said pole.

Whereof, we have hereunto subscribed our names to this specification.

CHRISTOPHER D. O'BRIEN, Jr.
GERALD R. O'BRIEN.